United States Patent [19]
Roth et al.

[11] 3,775,166

[45] Nov. 27, 1973

[54] PROCESS FOR PROTECTING A SUBSTRATE WITH A SULFOGUANIDINE INTUMESCENT COMPOSITION

[75] Inventors: Shirley H. Roth, Highland Park; Joseph Green, East Brunswick, both of N.J.

[73] Assignee: Cities Service Company, New York, N.Y.

[22] Filed: Jan. 31, 1972

[21] Appl. No.: 222,310

[52] U.S. Cl........... 117/136, 117/138.8 B, 117/147, 106/15 FP, 252/8.1
[51] Int. Cl............................................... C09d 1/00
[58] Field of Search................. 117/136, 137, 138.5, 117/147; 252/8.1; 106/15 FP; 424/321; 260/397.6, 397.7

[56] References Cited
UNITED STATES PATENTS

| | | | |
|---|---|---|---|
| 2,218,490 | 10/1940 | Winnek............................ | 260/397.7 |
| 2,380,006 | 7/1945 | Winnek et al.................... | 260/397.7 |
| 2,416,995 | 4/1947 | Hartmann et al................ | 260/397.7 |
| 3,461,143 | 8/1969 | Nargund.......................... | 260/397.7 |
| 2,616,866 | 11/1952 | Juda................................. | 117/136 X |
| 2,872,355 | 2/1959 | Muller et al...................... | 117/136 |
| 2,984,640 | 5/1961 | Kaplan............................. | 117/136 X |

*Primary Examiner*—William D. Martin
*Assistant Examiner*—Theodore G. Davis
*Attorney*—J. Richard Geaman

[57] ABSTRACT

A process for protecting a substrate from heat and fire with an intumescent composition which comprises sulfaguanidine, i.e., p-aminobenzenesulfonylguanidine, as the intumescent agent. The sulfaguanidine may be employed in conjunction with additives conventionally used in intumescent compositions.

1 Claim, No Drawings

PROCESS FOR PROTECTING A SUBSTRATE WITH A SULFOGUANIDINE INTUMESCENT COMPOSITION

BACKGROUND OF THE INVENTION

1. Field of the Invention

This invention relates to intumescent compositions and more particularly relates to such compositions containing a one-component intumescent agent.

2. Description of the Prior Art

It is known that a substrate may be protected from heat and fire by the application of an intumescent composition. Intumescent compositions of the prior art usually contain an intumescent agent having at least three components, i.e., a carbonific, a spumific, and a catalyst; and they are typically characterized by the disadvantages of high cost, low spreading rate, relatively poor efficiency, poor water resistance, and poor weatherability.

As disclosed in U. S. Pat. No. 3,535,130 it has already been discovered that a one-component intumescent agent has advantages over multicomponent intumescent agents. However, the intumescent agents of the patent have poor adherence to substrates and have an undesirable degree of moisture sensitivity.

SUMMARY OF THE INVENTION

An object of this invention is to provide a novel one-component intumescent agent.

Another object is to provide such an intumescent agent having good efficiency and a low level of moisture sensitivity.

These and other objects are attained by using sulfaguanidine as an intumescent agent.

DESCRIPTION OF THE PREFERRED EMBODIMENTS

For use in protecting a substrate from heat and fire, the intumescent agent of the invention may be applied in any suitable manner, e.g., electro-deposition, spraying of powdered intumescent agent onto an adhesive substrate, etc. However, it is usually preferred to compound the intumescent agent with a binder, e.g., nitrocellulose, and optionally also with one or more of the other ingredients conventionally used in intumescent compositions, e.g., stabilizers, dispersing agents, pigments, driers, biocides, anti-foamers, thickeners, protective colloids, fillers, blowing agents, etc.; disperse the composition in a suitable liquid medium, e.g., water or a solvent or solvent mixture; and apply the coating composition thus formed to the substrate to be protected. As is the case with conventional intumescent coating compositions, it is frequently convenient to apply these coating compositions in the form of a paint having a solids content of about 10–70% by weight and an intumescent agent/binder weight ratio of about 0.075–14/1 to deposit a coating having a dry thickness of about 0.001–0.75 inch.

The intumescent agent of the invention is efficient, has low moisture sensitivity, and intumesces without flaming to form foams having good volume, cell structure, and adherence to substrates, such as wood, metal, and plastics. It is also useful as a flame retardant in normally flammable compositions.

The following example is given to illustrate the invention and is not intended as a limitation thereof.

EXAMPLE

Place one gram of sulfaguanidine in an aluminum pan and flame it with a propane torch. The compound intumesces without melting or flaming to form an excellent volume of foamed char having good structure and resiliency.

It is obvious that many variations may be made in the products and processes set forth above without departing from the spirit and scope of this invention.

What is claimed is:

1. A process for protecting a substrate from heat and fire which comprises applying thereto an intumescent composition comprising sulfaguanidine as the intumescent agent.

* * * * *